US008146968B1

(12) United States Patent
Starr

(10) Patent No.: US 8,146,968 B1
(45) Date of Patent: Apr. 3, 2012

(54) ADAPTIVE GRIP

(76) Inventor: Gabriel Starr, Richmond Hill, NY (US)

( * ) Notice: Subject to any disclaimer, the term of this patent is extended or adjusted under 35 U.S.C. 154(b) by 30 days.

(21) Appl. No.: 12/803,843

(22) Filed: Jul. 7, 2010

(51) Int. Cl.
*B65G 7/12* (2006.01)

(52) U.S. Cl. ......................................... 294/25; 294/99.2

(58) Field of Classification Search .................... 294/25, 294/28, 99.1, 99.2, 902; 16/110.1; 15/443, 15/435; 623/65; 401/6
See application file for complete search history.

(56) References Cited

U.S. PATENT DOCUMENTS 197,135 A * 11/1877 Hunting ........................ 294/104
2,212,013 A * 8/1940 Devareaux .................... 294/100
4,602,885 A * 7/1986 Bischoff et al. ................... 401/6
4,666,451 A * 5/1987 Samaria .......................... 623/65
6,237,194 B1 * 5/2001 Williams ........................ 16/430
2007/0200379 A1 * 8/2007 Key et al. ........................ 294/88
2007/0228092 A1 * 10/2007 Hammermeister ........... 224/218
2009/0322108 A1 * 12/2009 Bina ............................ 294/99.2

* cited by examiner

*Primary Examiner* — Saul Rodriguez
*Assistant Examiner* — Gabriela Puig
(74) *Attorney, Agent, or Firm* — Bay State IP, LLC; Adam J. Bruno; Janine D. Geraigery

(57) ABSTRACT

An adaptive grip for aiding users with limited hand use and dexterity to grasp everyday essential objects, comprising a finger grip, an anchor, and a clasping mechanism. The finger grip includes at least two rings for inserting fingers of the user and a vertical stem for coupling with the anchor which is positioned perpendicularly along the vertical stem. The clasping mechanism has a clip with rubber-lined curved teeth for grasping objects, a lever for loosening and tightening the clip around the object, and a horizontal shaft for securing the clasping mechanism to the anchor. The user can position and secure the anchor and clasping mechanism by a first and second thumb screw, respectively, to maintain a comfortable and easy to use adaptive grip.

13 Claims, 3 Drawing Sheets

ADAPTIVE GRIP

BACKGROUND OF THE INVENTION

Field of the Invention

The invention relates to a grip, and more particularly, to an adaptive grip for aiding users with limited hand use and dexterity to grasp and maneuver everyday essential objects. The adaptive grip specifically comprises a finger grip including three rings for accepting the user's fingers, a lever operated clasping mechanism for grasping desired objects, and an anchor for manually adjusting and positioning the clasping mechanism.

Many people suffer from limited hand use. Everyday essential objects, such as a toothbrushes, razors, forks, spoons, knives, pens, etc. can prove difficult to grasp and use. Patients who suffer from arthritis, strokes, or spinal cord injuries experience decreased dexterity and grip strength. While those recovering with wrist casts often have difficulty in lifting and using small objects.

Overtime a patient may gain a portion of hand usage. However, many patients will continue to suffer from the inability to grasp small objects. In most situations, persons who suffer from limited hand use must rely on other individuals to assist in daily tasks. This lack of freedom can be embarrassing, burdensome, and onerous for those involved.

While there are multiple products in the marketplace to assist those who suffer from limited hand use, majority of these products are designed for use with a specific task. There is a need for one product in which multiple objects are grasped and is discrete so as not to draw attention in public.

The present invention seeks to eliminate the need for multiple devices to complete each task. A variety of everyday essential objects are held into a comfortable and versatile position during use. As a relatively smaller device, the present invention seeks to eliminate the embarrassment and distraction of a larger device.

SUMMARY OF THE INVENTION

It is an object of the invention to facilitate hand and finger independence by those suffering from mobility issues. Accordingly, the present invention is an adaptive grip, having a finger grip and a removably coupled clasping mechanism that allows users the ability to hold and maneuver everyday essential objects, such as, toothbrushes, spoons, forks, knives, pencils, pens, razors and the like.

It is a further object of the invention to provide an adaptive grip capable of being decorated or blending in with the elements so as not to handicap the user. Accordingly, the finger grip of the present invention contains at least two rings and a vertical stem, wherein the rings resemble jewelry bands and appear to be normal user accessories. In addition, the clasping mechanism is designed to be concealable while in use, under the palm of the user's hand.

It is another object of the invention to provide an adaptive grip that is adjustable for fitting users having different sized hands. Accordingly, the adaptive grip contains an adjustable anchor which secures the clasping mechanism to the finger grip by means of the vertical stem. The anchor is capable of adjusting the clasping mechanism closer to or further away from the stem by means of a thumb screw or other like fastener.

It is another object of the invention to provide an adaptive grip that is versatile. Accordingly, the anchor of the present invention is uniquely designed to allow the clasping mechanism to manually swivel 360 degrees around the vertical stem thereby positioning the clasping mechanism in a position that is suitable for use by either a right-handed or left-handed user.

It is another object of the invention to provide an esthetically pleasing adaptive grip. Accordingly, the rings of the finger grip may be made of gold, silver, and platinum and contain removable attachments, such as jewels, gems, and other fashionable accessories which enhance the stylish attributes of the invention.

It is another object of the present invention to provide a lightweight adaptive grip. Accordingly, the adaptive grip is comprised of metal or plastic which is lightweight and thereby seek to prevent any stress on the user's hands when handled.

It is another object of the invention to provide a adaptive grip that even after extended use continues to be painless for the wearer. Accordingly, the rings of the finger grip include removably coupled silicone inserts for providing a maximum level of comfort around the user's fingers.

It is another object of the invention to provide a portable adaptive grip. Accordingly, the adaptive grip is designed to be compact and portable enough to carry in a user's pocket or handbag such that it is easily accessible as needed.

It is another object of the invention to provide a adaptive grip which prevents grasped object from slipping during use. Accordingly, the clasping mechanism includes a clip which has teeth designed with a rubber lining which grips and holds desired objects during use and thereby prevents unnecessary slippage.

It is another object of the invention to provide an adaptive grip capable of being used for multiple purposes. Accordingly, the clasping mechanism of the present invention is capable of lifting a variety of objects such as spoons, forks, knives, toothbrushes, pens, razors and other like objects, for aiding a user in completing tasks utilizing these objects.

The invention is an adaptive grip for aiding users with limited hand use and dexterity to grasp everyday essential objects. The adaptive grip is comprised of a finger grip, an anchor, and a clasping mechanism. The finger grip is comprised of three rings for accepting the fingers of the user therein and a vertical stem for coupling with the anchor which is positioned perpendicularly along the vertical stem. The clasping mechanism has a clip with rubber-lined, curved teeth for grasping objects, a lever for loosening and tightening the clip around the object, and a horizontal shaft for securing the clasping mechanism to the anchor. The user can position and secure the anchor and clasping mechanism by a first and second thumb screw, respectively, to maintain a comfortable and easy to use adaptive grip.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
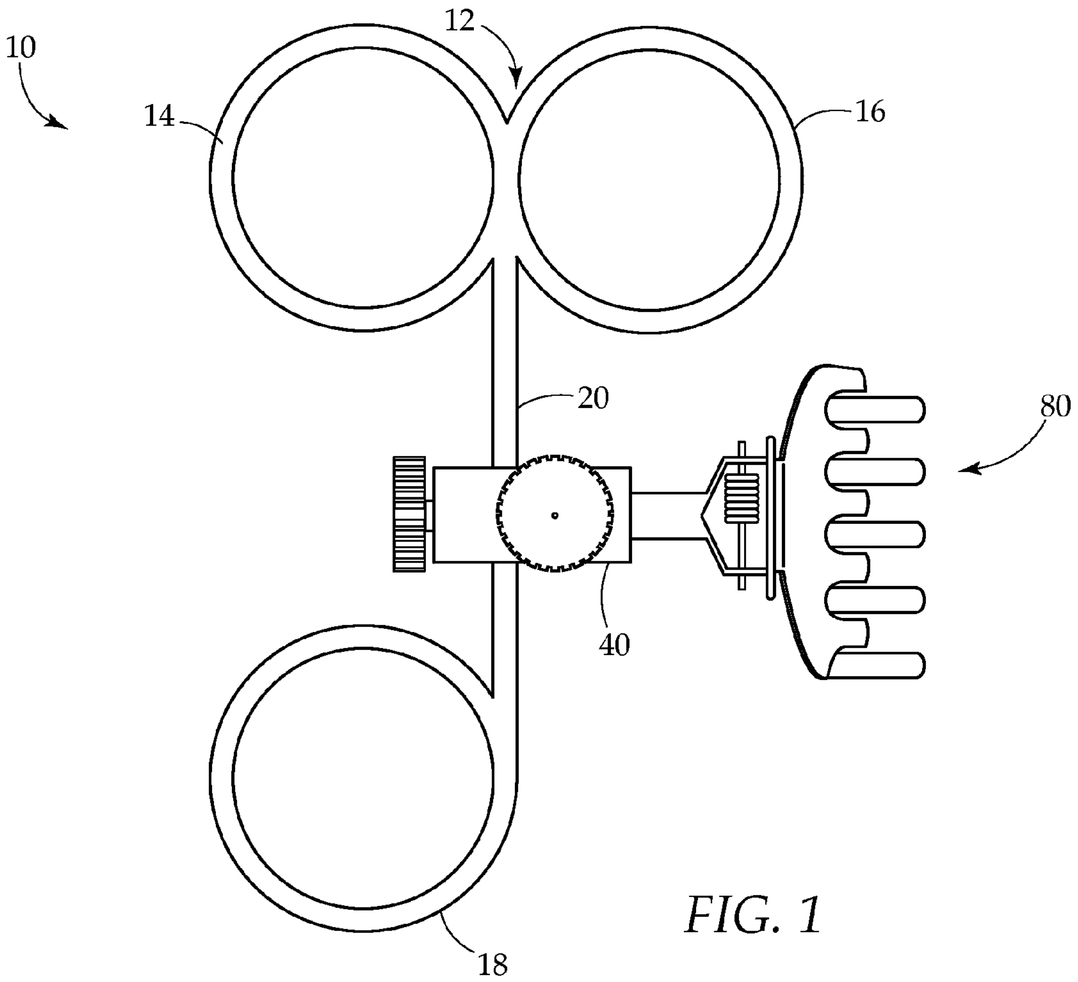
FIG. 1 is a front plan view of the adaptive grip of the present invention, illustrating a finger grip, anchor, and clasping mechanism.

Everyday essential objects such as toothbrushes, spoons, forks, knives, pens, pencils, and razors are painful to hold and use for those suffering from limited hand use, dexterity, and mobility. FIG. 1 illustrates the adaptive grip 10 for aiding users with limited hand use and dexterity to grasp everyday essential objects. In the broadest context, the adaptive grip of the present invention includes a finger grip 12, an anchor 40, and a clasping mechanism 80.

The finger grip 12 is comprised of at least two rings, but preferably three, coupled together by a vertical stem 20. The vertical stem 20 is approximately four inches in length and substantially cylindrical. In the preferred embodiment, the finger grip 12 includes a first ring 14, a third ring 16, and a bottom ring 18. The first ring 14 and the bottom ring 18 of the finger grip 12 are connected circumferentially by the vertical stem 20 positioned therebetween and are parallel in orientation to one another, along a common plane. In the preferred embodiment, the third ring 16 is integrally coupled to the first ring 14 by a screw plug or other like fastener, at the point where the first ring 14 and the vertical stem 20 converge, such that the third ring 16 is perpendicular to the vertical stem 20. It is contemplated that the third ring 16 is removably coupled to the first ring 14 and is adjustable in three different angular positions along the first ring 14 by use of the screw plugs based upon a user's preference and level of comfort.

In the preferred embodiment, the first, third, and bottom rings 14, 16, 18 are made in standard ring sizes for accepting the fingers of the user. The sizes of the rings are adjustable to fit each individual user by comfort linings, made of silicone or the like. Preferably, three different sizes of comfort inserts are available to maintain the correct ring size for each user. It is contemplated that customized rings or the user's own ring are incorporated into the grip 10. In addition, it is preferable that the rings 14, 16, 18 are made from a lightweight metal, including but not limited to white gold, yellow gold, silver, platinum, titanium, or other like metal. Other lightweight materials for the rings 14, 16, and 18 are also contemplated including plastic and aluminum.

Similarly, the vertical stem 20 of the finger grip 12 is made of a lightweight material comparable to that used for the rings 14, 16, 18, with a similar thickness to the rings 14, 16, and 18.

Preferably, the rings 14, 16, 18 are smooth and round for comfortably inserting the fingers of the user therethrough. In additional embodiments, the rings 14, 16, 18 may also include soft edges instead of being entirely rounded, for better suiting the user's needs and comfort level. It is also contemplated, that the rings 14, 16, 18 may be lined with silicone inserts for allowing the user to comfortably maintain hold of the adaptive grip 10.

In additional embodiments, the rings 14, 16, 18 may resemble those worn as jewelry. In the preferred embodiment however, the rings 14, 16, 18, are similar to simple metal wedding bands. Further, it is contemplated that the rings 14, 16, 18, are wearble with removable attachments, such as jewels, gems, and other fashionable accessories to enhance the stylish needs of the user. The addition of fashionable accessories to the rings 14, 16, 18 significantly increases the user's likelihood of wearing the grip 10 because it decreases the possibility that others will notice that the grip is an aid, and thereby it seeks to prevent any embarrassment caused by its use.

The anchor 40 of the adaptive grip 10 is positionable along the vertical stem 20 of the finger grip 12. The anchor 40 integrally couples the clasping mechanism 80 to the finger grip 12. The position of the clasping mechanism 80 is adjustable by the anchor 40 which provides the user with a comfortable and easy to use grip 10. The anchor 40 adjusts the clasping mechanism 80 both circumferentially around and laterally along the vertical stem 20. The anchor 40 allows the clasping mechanism 80 a great amount of freedom in positioning, such that the user is able attain the maximum level of comfort which using the grip 10. Specifically, the anchor 40 provides the clasping mechanism 80 the ability to be positioned at a plurality of different intervals either closer to or further away from the vertical stem 20.

Figure 1A:
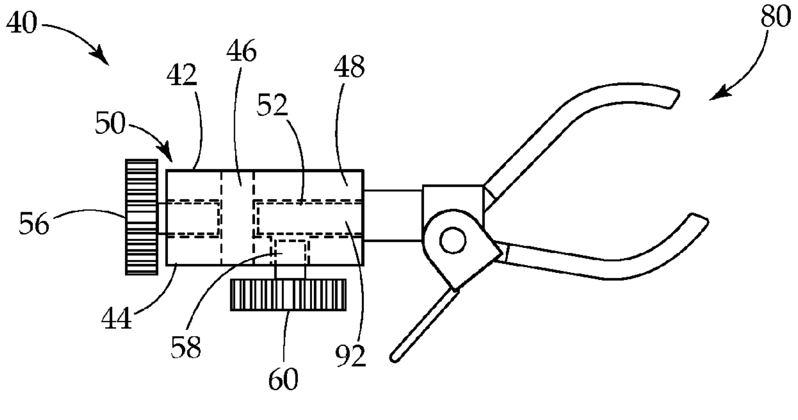
FIG. 1A is an enlarged view of the anchor of the adaptive grip of the present invention.

FIG. 1A is an exploded view of the anchor 40. Here, the substantially cylindrical anchor 40 is positioned perpendicularly to and along the vertical stem 20. As show, the anchor 40 has a top surface 42, a bottom surface 44, and a first vertical channel 46 that extends from the top surface 42 through to the bottom surface 44. The first vertical channel 46 of the anchor 40 is substantially cylindrical and secures a portion of the substantially cylindrical vertical stem 20 therein. The anchor 40 however is still capable of moving freely along the vertical stem 20, when not secured by a fastener.

The anchor 40 is further comprised of a front portion 48, a back portion 50, and a substantially cylindrical horizontal channel 52 extending from the front portion 48 to the back portion 50. The front portion 48 of the horizontal channel 52 of the anchor 40 accepts the clasping mechanism 80 therein. Additionally, the front portion 48 of the anchor 40 has a second vertical channel 58 extending perpendicularly from the horizontal channel 52 to the bottom surface 44 of the anchor 40. The second vertical channel 58 accepts a fastener therein, preferably a second thumb screw 60, or other like fastener. The second thumb screw 60 fastens the clasping mechanism 80 in a selected position within the channel 58. As discussed below, the shaft 92 of the clasping mechanism 80 is accepted into the horizontal channel 52. The clasping mechanism 80 has the freedom to move within the channel 52, by means of the shaft 92, until fastened; and can therefore be positioned close to or further from the vertical stem 20 depending on the amount of space the user and task requires.

Specifically, by loosening the second thumb screw 60, the shaft 92 of the clasping mechanism 80 is positionable either closer to the vertical stem 20 or further from the vertical stem 20. Once the clasping mechanism 80 is in a comfortable location for use, the user tightens the second thumb screw 60 which actuates the shaft 92 of the clasping mechanism 80 to firmly juxtapose the front portion 48 of the horizontal channel 52 and secure the clasping mechanism 80 therein.

The back portion 50 of the horizontal channel 52 of the anchor 40 accepts a first thumb screw 56, or other like fastener, to adjust the position of the anchor 40 along the vertical stem 20. By loosening the first thumb screw 56, the anchor 40 is able to slide upwardly or downwardly along the vertical stem 20. The anchor 40 also provides the clasping mechanism 80 the ability to swivel around the vertical stem 20 so that the adaptive grip 10 is suitable for right-handed or left-handed users. Similarly, once the anchor 40 is in a suitable position, the user tightens the first thumb screw 56 and actuates the vertical stem 20 to firmly juxtapose the vertical channel 46 and secure the vertical stem 20 within anchor 40.

Figure 2:
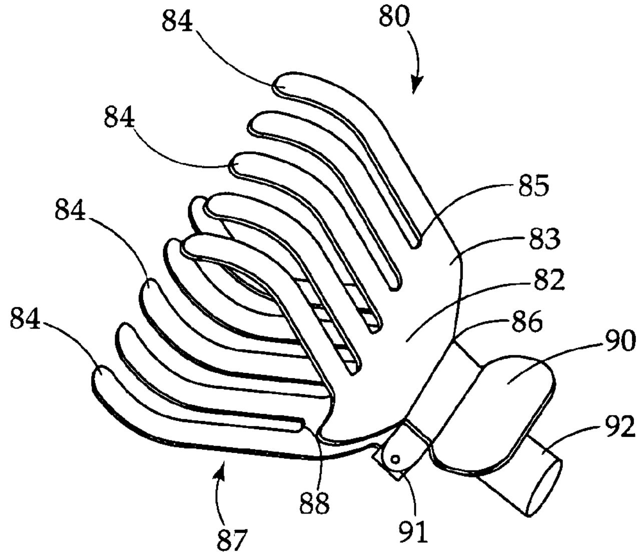
FIG. 2 is a diagrammatic perspective view of the clasping mechanism of the adaptive grip of the present invention.
Figure 2A:
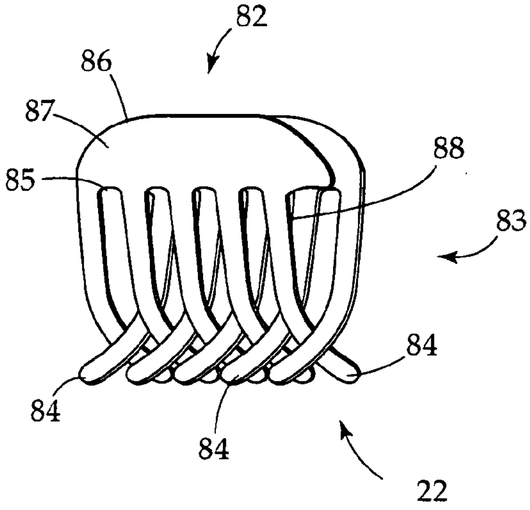
Figure 2B:
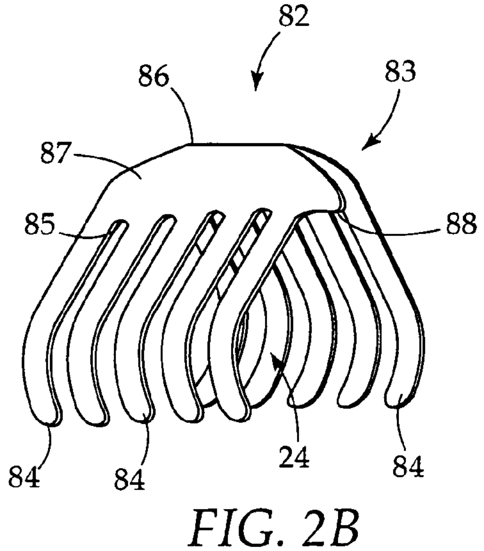

FIG. 2 illustrates the clasping mechanism 80 of the adaptive grip 10. The clasping mechanism 80 includes a clip 82 for selectively grasping an object. The clip 82 is comprised of a first branch 83 and a second branch 87. Both branches 83, 87 have a plurality of curved teeth 84 and a first end 86. The first and second branches 83, 87 are elongated in shape and coupled together at the first ends 86 by a hinge 91. The hinge 91 enables the clip 82 to toggle between a close position 22 (shown in FIG. 2A) and an open position 24 (shown in FIG. 2B). The first branch 83 has a first lateral edge 85 from which the curved teeth 84 extend laterally towards the second branch 87. Similarly, the second branch has a second lateral edge 88 from which the curved teeth 84 extend laterally and curve towards the first branch 83.

In the close position 22, the curved teeth 84 of the first branch 83 are interlocked with the curved teeth 84 of the second branch 87 for firmly grasping the desired object in a suitable position for use. In the open position 24, the curved teeth 84 of both branches 83, 87 are separated from one another and allow the clip 82 to receive the desired object. In addition, the curved teeth 84 of the first branch 83 and second branch 87 contain a rubber-lining to prevent the object from slipping.

The clasping mechanism 80 of the adaptive grip 10 contains a lever 90 for adjusting the clip 82. The lever 90 extends downwardly from the hinge 91 of the clip 82. The hinge 91 is integrally coupled to the lever 90 for toggling the clip 82 between the close and open positions 22, 24. Preferably, the user inserts their thumb through the bottom ring 18 and is capable of controlling the clip 82 from the close or open position 22, 24. By simply pulling the lever 90 towards the vertical stem 20 of the finger grip 12 the user is able to position the clip 82 in the open position 24. Similarly, by releasing the lever 90 the user is able to position the clip 82 around the desired object. Or alternatively, when no object is grasped, releasing the lever 90 will return the clip 82 to the close position 22.

The clip 82 is integrally coupled to the shaft 92 of the clasping mechanism 80. The shaft 92 extends downwardly from the clip 82 such that the clip 82 is preferably at a forty-five degree angle with the shaft 92. This positioning of the clip 82 allows the user to adjust the grasped object at the most comfortable position while in use. The shaft 92 removably couples within the anchor 40 by insertion into the front portion 48 of the horizontal channel 52 of the anchor 40.

Figure 3:
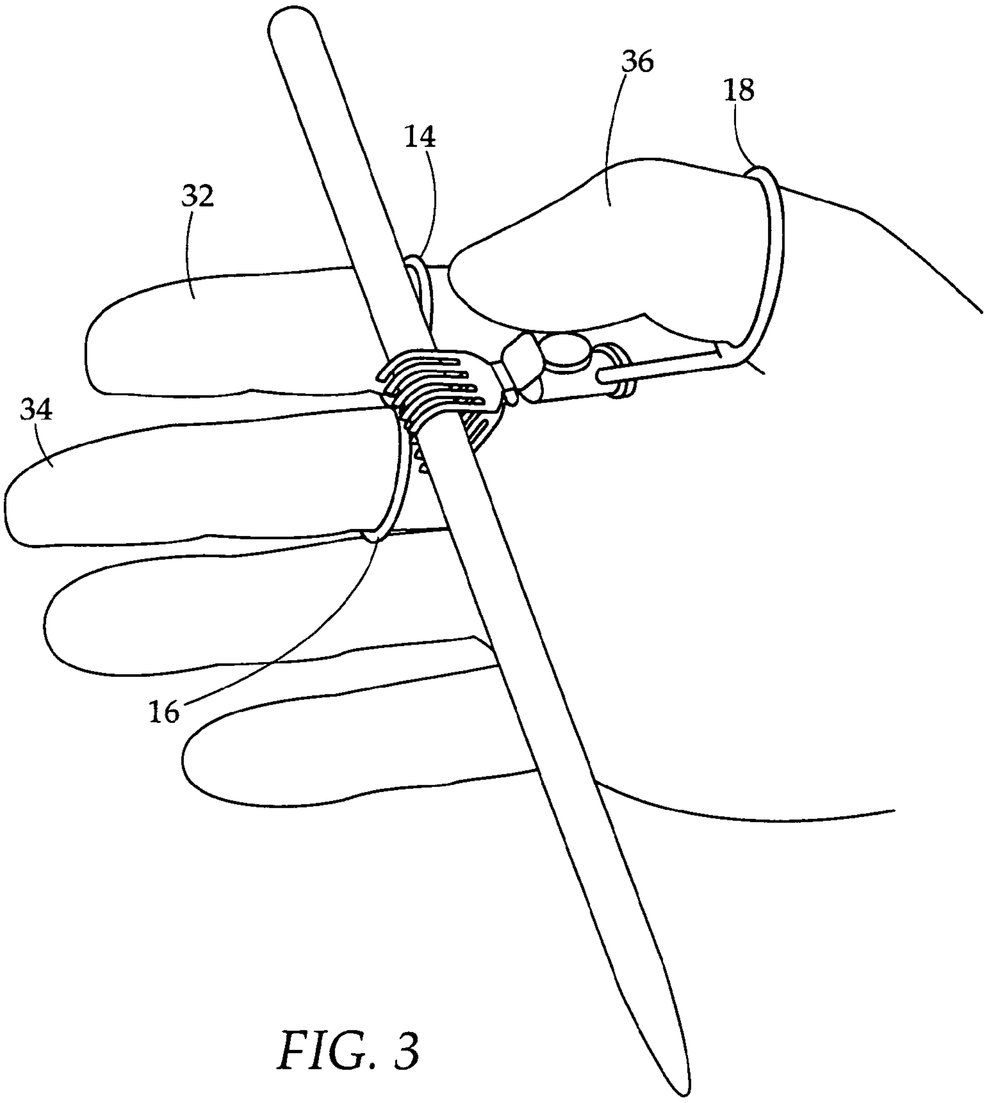
FIG. 3 is a diagrammatic perspective view of the adaptive grip of the present invention, in use, wherein a user is holding a pen to write by means of the clasping mechanism.

FIG. 3 is an illustration of the preferred embodiment of the adaptive grip 10 in use, grasping a pen for aiding a right-handed user to write. In alternate embodiments, the invention is easily adapted for use by a left-handed user. Here, the first ring 14 accepts the user's right index finger 32 while the third ring 16 accepts the user's right middle finger 34. Additionally, the bottom ring 18 is positionable for inserting the user's right thumb 36. These are preferable finger placements for the using the grip 10 by a right handed user, however, the user may selectively alter the positioning to achieve a more comfortable grip.

When using the adaptive grip 10 for writing a note, the first step is to configure the adaptive grip 10 for holding a pen based on whether the user is utilizing their right or left hand. As discussed supra, for purposes of illustration only a right-handed user is selected. Next, the user loosens the first thumb screw 56 of the anchor 40 and adjusts the position of the anchor 40 around the vertical stem 20 to direct the clasping mechanism 80 to a suitable position. Such position would be different and likely the mirror opposite for a left-handed user than a right-handed user. For either a right-handed or left-handed user the clasping mechanism 80 is positioned such that the clip 82 is pointing away from the user's hand. The anchor 40 is rotatable around the vertical stem thereby providing versatility in the positioning of the clasping mechanism to allow the adaptive grip 10 proper fit for a right-handed or left-handed user.

Next, the user determines whether the anchor 40 or clasping mechanism 80 is best adjusted to fit the user's hand and needs of the specific task of writing a note. With the first thumb screw loosened, the user adjusts the anchor 40 upwardly or downwardly along the vertical stem 20, as desired. By loosening the second thumb screw 60, the user positions the clasping mechanism 80 either closer to or further from the finger grip 12 to achieve a comfortable hold. Preferably, the clasping mechanism 80 is positioned such that the user may reach the lever 90 of the clasping mechanism 80 using their thumb 36 to adjust the clip 82 as desired.

Once the desired positions of the clasping mechanism 80 and anchor 40 are achieved, the user tightens both the first thumb screw 56 and second thumb screw 60 and then inserts their fingers, discussed supra, into the designated rings 14, 16, and 18.

With the clip 82 in the closed position 22, the user, pulls the lever 90 of the clasping mechanism 80 towards the vertical stem 20 and causes the clip 82 to remain in the open position 24. The user places a ready to-use pen within the clip 82. The user then releases the lever 90 of the clasping mechanism 80 with their right thumb and causes the curved teeth 84 of the first and second branch, 83 and 87, of the clip 82 to firmly grasp the pen. The user is then able to use the pen to write a note by controlling the adaptive grip 10.

To release the pen, the user simply pulls the lever 90 of the clasping mechanism 80 with their right thumb, which causes the clip 82 to open from the close position 22 into the open position 24. Depending on the grip 10 orientation, the pen may naturally fall out of the curved teeth 84 or be removed by the user with their left hand. Finally, the user releases the lever 90 with their right thumb and the clip 82 is returned to the close position 22. The user is then free to remove their fingers from the rings 14, 16 and 18 and store the grip 10 for later use, or use the grip 10 to complete another task.

In conclusion, presented herein is an adaptive grip. The invention is illustrated by example in the drawing figures, and throughout the written description. It should be understood that numerous variations are possible, while adhering to the inventive concept. Such variations are contemplated as being a part of the present invention.

What is claimed is:

1. An adaptive grip comprising:

a finger grip having three rings, including a first ring, a third ring and a bottom ring, said finger grip including a substantially cylindrical vertical stem, wherein said first ring and said bottom ring are parallel in orientation and connected circumferentially to one another by said vertical stem therebetween, wherein said third ring is coupled to said first ring perpendicular to said vertical stem;

a substantially cylindrical anchor removably coupled along said vertical stem and perpendicularly adjustable, comprising:

a top surface, a bottom surface, and a substantially cylindrical first vertical channel extending from said top surface to said bottom surface, wherein said first vertical channel accepts said vertical stem therein;

a front portion, a back portion, and a substantially cylindrical horizontal channel extending from said front portion to said back portion, wherein said front portion has a second vertical channel extending perpendicularly from said horizontal channel to said bottom surface;

a first thumb screw, wherein said back portion of said horizontal channel accepts said first thumb screw for adjusting said anchor upwardly or downwardly and circumferentially around, said vertical stem;

a second thumb screw, wherein said second vertical channel accepts said second thumb screw;

a clasping mechanism integrally coupled to said finger grip by said anchor, wherein said clasping mechanism comprises;

a clip having an elongated first and second branch and a hinge, wherein said branches each have a plurality of curved teeth and a first end, wherein said hinge couples together said first ends of said branches, wherein said curved teeth of said first branch extend laterally from a first lateral edge curving towards said second branch, and wherein said curved teeth of said second branch extend laterally from a second lateral edge towards said first branch;

a lever extending downwardly from said hinge for allowing said clip to toggle between an open and close position, wherein said curved teeth of said branches separate and space apart while in said open position and wherein said curved teeth of said branches are interlocked while in said close position; and a shaft integrally coupled and extending downwardly from said clip, wherein a forty-five degree angle is positioned between said clip and said shaft, wherein said front portion of said horizontal channel of said anchor accepts said shaft and said shaft is removably coupled to said anchor by said second thumb screw.

2. A method of using the adaptive grip of claim 1, for completing an everyday task, comprising the steps of:

(a) configuring the adaptive grip for use by either a right-hand or left hand user;

(b) loosening the clasping mechanism from the anchor by first thumb screw;

(c) adjusting the clasping mechanism for maximum comfort and support by swiveling the anchor around the vertical stem and sliding the anchor upwardly or downwardly along the vertical stem;

(d) securing the clasping mechanism in position along the vertical stem by tightening the first thumb screw;

(e) repeating steps (b) through (d) until a predetermined position is achieved;

(f) adjusting distance of clasping mechanism in relation to the vertical stem and specific task requirements by loosening the second thumb screw and sliding the clasping mechanism horizontally away from or closer toward the vertical stem, and then tightening said second thumb screw;

(g) repeating step (f) until a predetermined position is achieved;

(h) arranging the user's fingers into the finger grip by inserting the index finger into the first ring, the middle finger into the third ring, and the thumb into the bottom ring;

(i) opening the clip by pulling and holding the lever of the clasping mechanism with the user's thumb, toward the vertical stem;

(j) inserting a task specific object within the clip;

(k) grasping the object between the teeth of the clasping mechanism by releasing the thumb from holding the lever; and (l) using the object to complete the task.

3. The method of using the adaptive grip of claim 2, further comprising the steps of:

(a) removing said object from said clip by opening the clip by pulling and holding the lever of the clasping mechanism with the user's thumb, toward the vertical stem; and (b) returning the clip to the closed position by releasing the thumb from holding the lever.

4. An adaptive grip comprising:

a finger grip having at least two rings, including a first ring and a bottom ring, said finger grip including a substantially cylindrical vertical stem, wherein said first ring and said bottom ring are parallel in orientation and connected circumferentially to one another by said vertical stem therebetween;

an anchor having a first vertical channel for accepting said vertical stem therein wherein said anchor further comprises:

a top surface;

a bottom surface; and said first vertical channel extending from said top surface to said bottom surface, and wherein said first vertical channel accepts said vertical stem therein; a front portion;

a back portion; and a horizontal channel extending from said front portion to said back portion, wherein said front portion has a second vertical channel perpendicularly oriented to said horizontal channel; and a clasping mechanism integrally coupled to said finger grip by said anchor, comprising a clip having an elongated first and second branch, said branches positionable inwardly toward each other and each branch having at least three inwardly curving teeth, and a hinge coupling together said branches.

5. The adaptive grip of claim 4, further comprising a third ring coupled to said first ring and being perpendicular to said vertical stem.

6. The adaptive grip of claim 4, wherein the anchor further comprises a first thumb screw, wherein the back portion of the horizontal channel accepts the first thumb screw for adjusting the anchor upwardly or downwardly and circumferentially around, the vertical stem.

7. The adaptive grip of claim 6, wherein the clasping mechanism further comprises an attachment means for integrally coupling within the front portion of the horizontal channel of the anchor.

8. The adaptive grip of claim 7, wherein the attachment means is a shaft extending downwardly from the clip, wherein a forty-five degree angle is between the clip and the shaft, and the front portion of the horizontal channel of the anchor accepts the shaft and the shaft is removably coupled to the anchor by the second thumb screw.

9. The adaptive grip of claim 4, wherein the anchor further comprises a second thumb screw, wherein the vertical channel accepts the second thumb screw.

10. The adaptive grip of claim 4, wherein the branches each have a plurality of curved teeth and a first end, wherein said hinge couples together the first ends of the branches, wherein the curved teeth of the first branch extend laterally from a first lateral edge curving towards the second branch, and wherein the curved teeth of the second branch extend laterally from a second lateral edge towards the first branch.

11. The adaptive grip of claim 4, wherein the hinge includes an adjustment means for allowing the clip to toggle between an open and close position, wherein the curved teeth of the branches are separate and spaced apart while in the open position and wherein the curved teeth of the branches are interlocked while in the close position.

12. The adaptive grip of claim 11, wherein the adjustment means is a lever extending downwardly from the hinge for allowing the clip to toggle between the open and close position.

13. The adaptive grip of claim 4, wherein the rings include smooth and rounded, or soft edges.

* * * * *